US012765720B2

(12) United States Patent
Frost

(10) Patent No.: US 12,765,720 B2
(45) Date of Patent: Oct. 20, 2026

(54) PORTABLE GRILL AND FIRE PIT FOR A VEHICLE

(71) Applicant: Mercade Caimon Frost, Los Angeles, CA (US)

(72) Inventor: Mercade Caimon Frost, Los Angeles, CA (US)

( * ) Notice: Subject to any disclaimer, the term of this patent is extended or adjusted under 35 U.S.C. 154(b) by 350 days.

(21) Appl. No.: 18/627,068

(22) Filed: Apr. 4, 2024

(65) Prior Publication Data

US 2024/0335067 A1 Oct. 10, 2024

Related U.S. Application Data

(60) Provisional application No. 63/494,716, filed on Apr. 6, 2023.

(51) Int. Cl.
*A47J 37/07* (2006.01)

(52) U.S. Cl.
CPC .... *A47J 37/0763* (2013.01); *A47J 2037/0777* (2013.01)

(58) Field of Classification Search
CPC ............ A47J 37/0763; A47J 2037/0777; A47J 37/0704; A47J 37/0713
See application file for complete search history.

(56) References Cited

U.S. PATENT DOCUMENTS 3,692,351 A * 9/1972 Christopher ............ A47J 37/00 126/41 R
5,263,467 A * 11/1993 Jones .................. A47J 37/0713 126/42
6,263,867 B1 * 7/2001 Skelton ..................... B60R 9/02 248/240.1
9,162,626 B1 * 10/2015 Nelson ...................... B60R 9/00
10,022,016 B1 * 7/2018 Streett ....................... B60P 3/36
11,230,218 B2 * 1/2022 Chevalier ................. B60P 3/34
11,584,310 B2 * 2/2023 Cooper ..................... B60P 3/34
2004/0026946 A1 * 2/2004 Reed, III .............. B60P 3/0257 296/24.3

(Continued)

OTHER PUBLICATIONS

Flame King, Flame King RV Trailer Mounted Grill BBQ with Carry Bag, https://flamekingproducts.com/products/flame-king-rv-trailer-mounted-grill-bbq-with-carry-bag, website accessed on Aug. 30, 2024, in 5 pages.

(Continued)

*Primary Examiner* — Jesse S Bogue
(74) *Attorney, Agent, or Firm* — Knobbe Martens Olson & Bear LLP

(57) ABSTRACT

A mobile fire pit or grill assembly may include a grill, the grill comprising: a base surface, a cooking surface disposed above the base surface; and a plurality of collapsible legs disposed beneath the base surface, wherein the plurality of collapsible legs articulate between a stowed position and an extended position. A mobile fire pit or grill assembly may include a casing for securing the grill to the undercarriage of a vehicle, the casing comprising: a plurality of casing walls forming a chamber sized and shaped to receive the grill with the plurality of collapsible legs in the stowed position; and at least one vehicle mount disposed on the plurality of casing walls configured to couple the casing to the undercarriage of a vehicle.

13 Claims, 10 Drawing Sheets

(56) References Cited

U.S. PATENT DOCUMENTS

| | | | | |
|---|---|---|---|---|
| 2007/0006867 | A1 * | 1/2007 | Karney .................. | A47J 37/07<br>126/37 B |
| 2008/0190977 | A1 * | 8/2008 | Estabrook .......... | B62D 33/0273<br>224/535 |
| 2017/0231427 | A1 * | 8/2017 | Cathey ................ | A47J 37/0763<br>99/325 |
| 2022/0296042 | A1 | 9/2022 | Currid et al. | |

OTHER PUBLICATIONS

Grilla Grills, Grilla Pro Wheels, https://www.grillagrills.com/product/4000021, website accessed on Aug. 30, 2024, in 7 pages.

Hitchfire, F-20 Hitch Mounted Propane Grill, https://hitchfire.com/, website accessed on Aug. 30, 2024, in 8 pages.

* cited by examiner

PORTABLE GRILL AND FIRE PIT FOR A VEHICLE

INCORPORATION BY REFERENCE TO ANY PRIORITY APPLICATIONS

The present application claims the benefit of U.S. Provisional Patent Application No. 63/494,716, filed Apr. 6, 2023, and titled PORTABLE GRILL AND FIRE PIT FOR A VEHICLE, which is incorporated herein by reference in its entirety under 37 C.F.R. § 1.57.

BACKGROUND

Field

This disclosure relates generally to cooking appliances, and more particularly to portable grills, fire pits, and cooking surfaces.

Description

Outdoor grills and fire pits are great for social gatherings. Whether enjoying car camping, sporting-event tailgate parties, or a break from night skiing on a frosty winter evening, portable outdoor grills and fire pits allow people to come together and share warmth and delicious meals in the great outdoors. Grilling also has certain cooking advantages, including providing different flavors and aromas, different food options, and the ability to cook a variety of foods at once.

Though portable grills and fire pits are intended for use away from home, current portable outdoor grills and fire pits often require valuable trunk space or a dedicated trailer to be transported by vehicle. Transporting outdoor grills and fire pits inside a vehicle introduces harmful gases and dirty ash to the vehicle interior. Improved vehicle transport and storage would help portable grills and fire pits easier and more convenient to transport and use.

SUMMARY

The disclosure provides an improved portable grill and fire pit assembly that can be collapsed and secured to the undercarriage of a vehicle. This improved assembly will greatly ease the storage and transport of portable grills and fire pits by enabling users to transport the grills and fire pits beneath the vehicle, rather than inside the vehicle such as in a vehicle trunk. This transportation solution may make placement and removal of a portable grill from a vehicle easier because the user does not need to access the interior of the vehicle. The improved assembly may make transportation of a portable grill safer and cleaner by placing the grill, with its soot, ash, and cooking gases, on the outside of the vehicle where the contaminants are less likely to dirty the vehicle interior or harm its occupants.

The disclosed assembly overcomes the shortcomings of the prior art by providing a collapsible grill that can be received in a casing secured beneath the undercarriage of a vehicle. By storing and transporting the grill in this casing, the grill is easily accessible from outside the vehicle, where most grilling occurs, and the storage space inside the vehicle is kept free and clean. The grill can be slid out from the casing for use, then slid back into the casing for storage and transport.

In one aspect, a vehicle grill assembly is described. The vehicle grill assembly includes: a grill including a grill body; a cooking surface disposed on the grill body; and at least one collapsible leg disposed on the grill body, wherein the at least one collapsible leg transitions between a retracted position adjacent to the grill body and an extended position; and a casing for securing the grill to an undercarriage of a vehicle. The casing includes: a plurality of casing walls forming a chamber sized and shaped to receive the grill with the at least one collapsible leg in a stowed position; and at least one vehicle mount disposed on the plurality of casing walls configured to couple the casing to the undercarriage of a vehicle.

In some embodiments, the grill of the vehicle grill assembly is configured to receive one or more sections of two or more removable cooking surfaces. In some embodiments of the vehicle grill assembly, the two or more removable cooking surfaces include two or more types of cooking surfaces. In some embodiments of the vehicle grill assembly, the two or more removable cooking surfaces include at least one of a group of types of cooking surfaces including: a grill, a griddle, and a wok. In some embodiments of the vehicle grill assembly, the two or more removable cooking surfaces include at least one wok type of cooking surface, and the wok is collapsible. In some embodiments of the vehicle grill assembly, the grill is configured to receive at least two sections of two or more removable cooking surfaces, and wherein the grill includes a number of burners within the grill body that is equal to the number of sections of removable cooking surfaces the grill is configured to receive. In some embodiments of the vehicle grill assembly, the burners are removable from the grill body such that the grill can be used as a fire pit.

In some embodiments of a vehicle grill assembly, the casing further includes rails disposed within the chamber formed by the plurality of casing walls, configured to slide the grill into and out of the casing. In some embodiments, the rails at least partially support the grill in a partially-deployed position outside the casing.

In some embodiments of a vehicle grill assembly, the grill includes a lid that articulates between a cover position covering the cooking surface and an open position, wherein the lid includes lid sidewalls and a latch to couple the lid to a vehicle exterior for securing the lid in the open position. In some embodiments of a vehicle grill assembly, the grill body includes a plurality of sidewalls, wherein the plurality of sidewalls are collapsible. In some embodiments of a vehicle grill assembly, the at least one collapsible leg is a plurality of collapsible legs, and the plurality of collapsible legs is configured to support the grill above a ground surface in a fully-deployed position when the grill is fully removed from the casing.

In another aspect, a vehicle grill assembly is described. The vehicle grill assembly includes: a grill including a grill body; a cooking surface disposed on the grill body; and an attachment point disposed on the grill body; and a hitch sized and shaped to be received by a hitch receiver on a vehicle exterior, the hitch including a hitch knuckle; wherein the attachment point couples to the hitch knuckle and pivots on the hitch knuckle such that the grill can be placed in a stowed position folded up adjacent to the vehicle exterior and a first partially-deployed position extended out from the vehicle exterior.

In some embodiments of a vehicle grill assembly, the grill includes at least one collapsible leg disposed on the grill body, which at least one collapsible leg articulates between a retracted position adjacent to the grill body and an extended position wherein the at least one collapsible leg at least partially supports the grill against a ground surface.

In some embodiments of a vehicle grill assembly, the attachment point is removably coupled to the hitch and the grill includes a plurality of collapsible legs such that the grill is removable from the hitch receiver for use as a standalone grill. In some embodiments of a vehicle grill assembly, the grill includes a lid that articulates between a cover position covering the cooking surface and an open position. In some embodiments of a vehicle grill assembly, the grill is configured to receive one or more sections of two or more removable cooking surfaces. In some embodiments of a vehicle grill assembly, the two or more removable cooking surfaces include two or more types of cooking surface. In some embodiments of a vehicle grill assembly, the two or more removable cooking surfaces include at least two of a group of types of cooking surface including: a grill, a griddle, and a wok.

In another aspect, a method of collapsing and storing a grill beneath a vehicle is disclosed. The method includes: collapsing a plurality of collapsible legs of the grill; and sliding the grill into a casing sized and shaped to receive the grill, wherein the casing is secured to an undercarriage of the vehicle.

BRIEF DESCRIPTION OF THE DRAWINGS

In the drawings, which are not necessarily to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
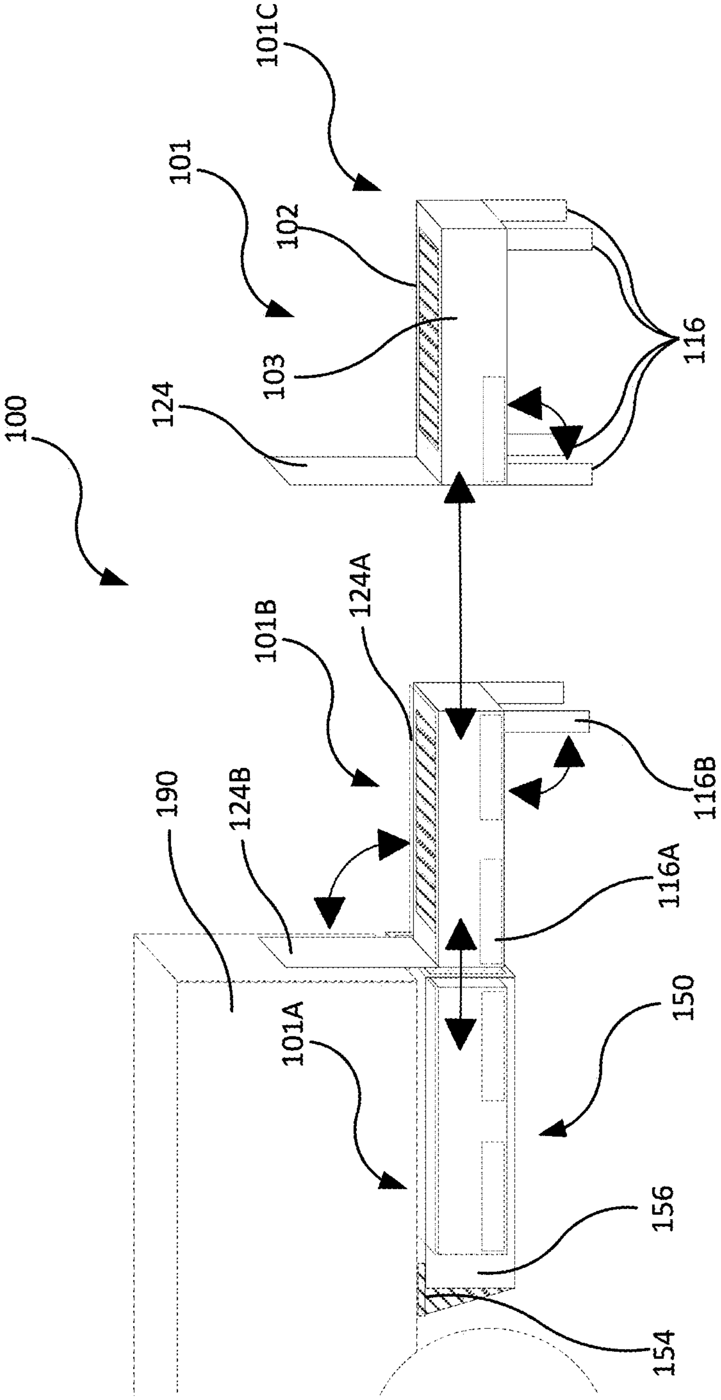
FIG. 1 is a perspective view of an example embodiment of a portable grill and fire pit assembly in stored, partially-deployed, and fully-deployed positions.

Embodiments of a grill, mobile grill, grill assembly and/or mobile fire pit which can be coupled to a vehicle are disclosed herein. Although certain illustrative embodiments are shown in the drawings and will be described below in detail, the application is not limited to these embodiments. However, there is no intention to limit the disclosure to the specific embodiments disclosed. On the contrary, the disclosure is intended to cover all modifications, alternative constructions, combinations, and equivalents falling within the spirit and scope of the disclosure.

FIG. 1 illustrates an example embodiment of a grill assembly 100 (e.g., assembly, mobile fire pit, mobile grill). The grill assembly 100 comprises grill 101 and casing 150 which operably secures grill 101 beneath the undercarriage of a vehicle 190.

Grill 101 includes a grill body 103, cooking surface 102, a plurality of collapsible legs 116, and lid 124. Cooking surface 102 is disposed on the upper part of grill body 103, and is made of a thermally-conductive material so to transmit heat from within the grill body 103 to food placed adjacent to the cooking surface 102. Lid 124 is disposed above cooking surface 102 and is connected to grill body 103 along at least one side of lid 124. Lid 124 is configured to rotate between a cover position 124A wherein lid 124 is disposed adjacent to and covering cooking surface 102 (0 degrees), and an open position 124B (e.g., 90 degrees) wherein lid 124 no longer covers cooking surface 102.

The plurality of collapsible legs 116 are disposed on the lower part of grill body 103 and are configured to transition between a retracted position 116A and an extended position 116B. When plurality of collapsible legs 116 are in extended position 116B, the plurality of collapsible legs 116 extend downward below grill body 103 so to elevate grill 101 above the ground surface. When plurality of collapsible legs 116 are in retracted position 116A, plurality of collapsible legs 116 are held closer to grill body 103, reducing the overall height of grill 101 for storage and transport.

Casing 150 includes a plurality of casing walls and at least one vehicle mount 154. The arrangement of the casing walls forms a chamber 156 sized and shaped to receive grill 101 when plurality of collapsible legs 116 are in retracted position 116A and lid 124 is in cover position 124A. Vehicle mount 154 is disposed outside the casing walls and is configured to couple casing 150 to the undercarriage of vehicle 190. When grill 101 is collapsed and received in chamber 156 of casing 150, grill 101 occupies stowed position 101A.

From stowed position 101A, the user may pull grill 101 at least partially out of chamber 156 of casing 150 and rotate lid 124 into open position 124B. Here, grill 101 occupies partially-deployed position 101B. In partially-deployed position 101B, grill 101 is adjacent to vehicle 190, and ready for use as a grill. Grill 101 maintains proximity to vehicle 190 in partially-deployed position 101B, and may use casing 150 to support grill body and/or use an attachment to vehicle 190 to maintain lid 124 in open position 124B. Lid 124 in open position 124B is disposed between cooking surface 102 and vehicle 190, protecting vehicle 190 from the heat and splatter of grill 101 in use.

In some embodiments, partially-deployed position 101B includes extending at least some of the plurality of collapsible legs 116 to extended position 116B. In some embodiments, no collapsible legs are extended and grill 101 is supported by rails from casing 150.

From either stowed position 101A or partially-deployed position 101B, the user may pull grill 101 fully out of chamber 156 of casing 150, extend all of the plurality of collapsible legs 116 to extended position 116B, and rotate lid 124 into open position 124B. Grill 101 now rests fully on the ground surface and occupies fully-deployed position 101C. In fully-deployed position 101C, grill 101 may be lifted and displaced any distance from vehicle 190 and is ready for use as a grill.

When in stowed position 101A, grill 101 is stowed within chamber 156 of casing 150 coupled by at least one vehicle mount 154 to the undercarriage of vehicle 190. Because grill 101 can occupy stowed position 101A underneath the undercarriage of vehicle 190, grill 101 can be nicely transported by vehicle 190 between locations, such as user's home and an outdoor recreation site. Because grill 101 can occupy partially-deployed position 101B and/or fully-deployed position 101C, grill 101 can position a cooking surface 102 out from under vehicle 190 and elevate that cooking surface 102 off the ground so to warm and cook meals at outdoor recreation sites. When the meal is finished and grill 101 no longer needed, grill assembly 100 allows grill 101 to transition to stowed position 101A by means of retracting the plurality of collapsible legs 116 to retracted position 116A, placing lid 124 in cover position 124A, and placing grill 101 within casing 150 beneath the undercarriage of vehicle 190 for storage or transport to a different location.

Grill assembly 100 has several advantages over traditional portable grills. Grill assembly 100 allows transportation of a portable grill by vehicle without using the vehicle trunk. Besides conserving valuable trunk space, transportation of a portable grill outside the vehicle preserves the cleanliness of the vehicle interior. Portable grills necessarily generate ash and char during the cooking process, which can be inconvenient to clean fully from the grill before transport. Outdoor recreation sites can be dirty places-mud, dirt, and insects can get on the surfaces of a portable grill when used outdoors. Finally, portable grills can be hot and offgas smoke and other fumes long after use. All these contaminants are undesirable for users generally, but especially so when trapped within the interior of a vehicle. By positioning grill 101 outside and beneath the vehicle for storage and transport, grill assembly 100 protects the user from these harms.

In some embodiments, the grill can be designed to be removable from the casing 150 and the vehicle, such that the grill can be a standalone grill in fully-deployed position 101C. Advantageously, the plurality of collapsible legs 116 can be configured to support the grill 101 without the vehicle, so the grill 101 can be used away from the vehicle and in myriad locations (e.g., backyard, campsite, patio, etc.).

In some embodiments disclosed herein, the grill assembly can be designed to be physically mounted to the undercarriage of a vehicle when the vehicle has wheels or rims which can have a diameter ranging from 20 inches to 22 inches. Additionally, the grill assembly can be designed to be physically mounted to the undercarriage of a vehicle with wheels that can have a diameter of 14 inches to 20 inches. In other embodiments, the grill assembly can be designed to be physically mounted to the undercarriage of a vehicle with wheels that can have a diameter of 22 to 30 inches.

In some embodiments disclosed herein, the casing 150 can be configured to extend from a side of the vehicle. The casing 150 can extend from the side of the vehicle 6 inches. In some embodiments, the casing 150 can extend from the side of the vehicle from 4 inches to 12 inches. Advantageously, in some embodiments, the casing 150 can be configured to be a step. The step can allow a user to enter or exit the vehicle by stepping down or stepping up onto the casing 150 of grill assembly 100. Therefore, in some embodiments, the casing 150 can support the weight of a user. The one or more vehicle mounts 154 can be configured (e.g., sized) to position the casing 150 to the undercarriage of a vehicle and support the weight of the user. In some embodiments, the casing 150 can have traction (e.g., tape, grip, bumps, raised surfaces, astroturf, etc.) on a top surface of the casing 150 which can prevent a user from slipping.

A method of collapsing and storing a grill beneath a vehicle is disclosed. According to some embodiments, the method comprises: collapsing a plurality of collapsible legs of the grill, then sliding the grill into a casing sized and shaped to receive the grill, wherein the casing is secured to the undercarriage of a vehicle. In some embodiments, the method also comprises collapsing the grill body. In some embodiments, collapsing the grill body comprises collapsing a wok on the cooking surface of the grill. In some embodiments, sliding the grill into a casing secured to the undercarriage of the vehicle comprises sliding the grill on rails attached to the grill body on corresponding rails attached to the casing. In some embodiments, the method comprises closing a lid of the grill to cover a cooking surface.

In some embodiments, a method of collapsing and storing a grill beneath a vehicle comprises: lowering a collapsible grill from an upright position to a lower position, then placing the grill into a casing sized and shaped to both receive the grill and fit underneath the undercarriage of a vehicle, wherein the casing is secured to the undercarriage of a vehicle. After the grill is stored beneath the vehicle, the grill can be stored and transported beneath the vehicle until it is needed.

A method of removing and expanding a grill from beneath a vehicle is disclosed. According to some embodiments, the method comprises: sliding the grill out from a casing disposed beneath the undercarriage of a vehicle to a low position, lifting the grill from the low position to an upright position, then expanding the grill from a collapsed position to a deployed position. In some embodiments, expanding the grill to a deployed position comprises unhinging or unfolding a plurality of collapsible legs disposed on the grill body from a retracted position to an extended position. In some embodiments, expanding the grill to a deployed position comprises opening a lid of the grill to expose a cooking surface. In some embodiments, expanding the grill to a deployed position comprises expanding a collapsible wok on the cooking surface. In some embodiments, sliding the grill out from a casing comprises sliding the grill along rails disposed on the grill and the casing.

In some embodiments, the method comprises removing the grill fully from its attachment to the vehicle, so to function as a standalone grill not physically connected to the casing, rails, or vehicle. In some embodiments, the method does not comprise removing the grill fully from its attachment to the vehicle, such that the grill in the deployed position is still at least partially supported by the vehicle.

In some embodiments, the grill assembly is configured to be physically mounted to the undercarriage of an automobile with wheels having a diameter of 14 inches, 16 inches, 18 inches, 20 inches, 22 inches, 24 inches, 26 inches, or a range between any of these diameters.

Figure 2:
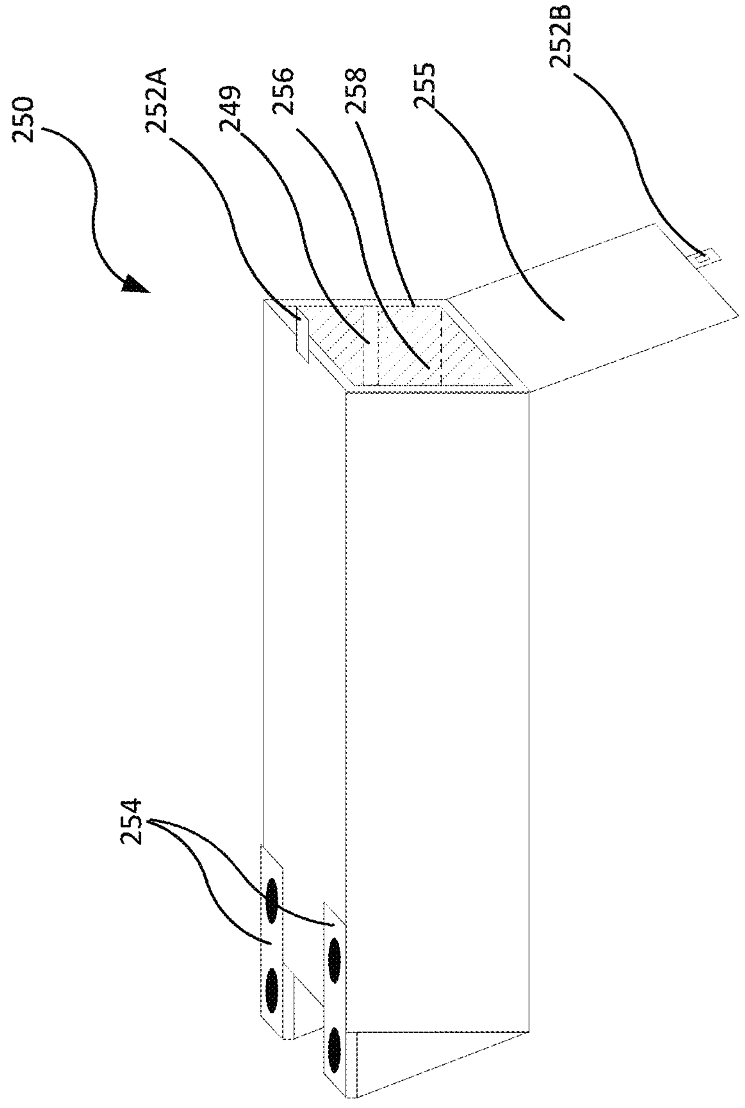
FIG. 2 is a perspective view of an example embodiment of a casing configured to couple beneath the undercarriage of a vehicle and receive and store a collapsed grill.

FIG. 2 illustrates an example embodiment of a casing 250. Casing 250 is configured to be physically mounted to the undercarriage of a vehicle and contain a grill when the grill is collapsed. Casing 250 includes a plurality of casing walls and at least one vehicle mount 254. The arrangement of the casing walls forms a chamber 256 sized and shaped to receive a grill. Vehicle mount 254 is disposed outside the casing walls and is configured to couple casing 250 to the undercarriage of a vehicle.

Casing 250 comprises an opening 258 sized and shaped to permit a grill to pass through the opening 258 when placing and removing a grill from chamber 256. In some embodiments, casing 250 comprises a cover 255 which can hinge closed to secure a grill within the casing 250. In some embodiments, casing 250 comprises lock 252A configured to retain cover 255 in the closed position and/or lock a grill within the casing 250 when lock 252A is mated with lock coupling 252B, disposed on cover 255.

The casing 250 can have a thin profile, such that the casing 250 can fit on the undercarriage of a vehicle without contacting a ground surface. In some embodiments, the casing 250 can be made of metal. In some embodiments the casing 250 can be made of a high strength polymer, such that the casing 250 can hold or contain a grill without deforming. In some embodiments the casing 250 is designed to protect a grill, such that the material can handle impact forces which can damage a grill if the grill was directly exposed to the impact forces.

In some embodiments, casing 250 includes rails 249 disposed in chamber 256 which couple with corresponding rails on the grill. These rails permit a grill to slide into the casing 250. In some embodiments, a grill can slide on rails 249 out of the casing 250 to transfer a grill from a stowed position to partially-deployed position. In a partially-deployed position, the grill is still operably connected to the vehicle via casing 250. Advantageously, this can allow a grill to be used while supported by the vehicle. In some embodiments, casing 250 can partially support a grill in a partially-deployed position, with the rest of the support provided by collapsible legs. Additionally, in some embodiments the grill can be configured to slide from an upright position adjacent to a vehicle to a collapsed position within the chamber 256 of the casing 250. In some embodiments, a user can then place a grill in partially-deployed position by pulling the grill out from casing 250 and opening a lid of the grill.

Figure 3A:
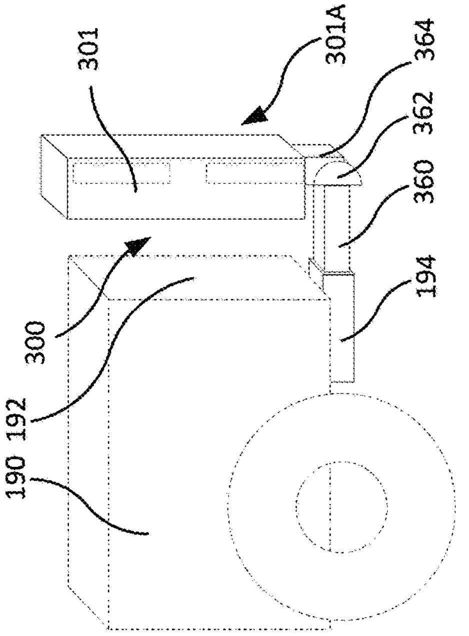
FIG. 3A is a perspective view of an example embodiment of a portable grill and fire pit assembly in a stored position.
Figure 3B:
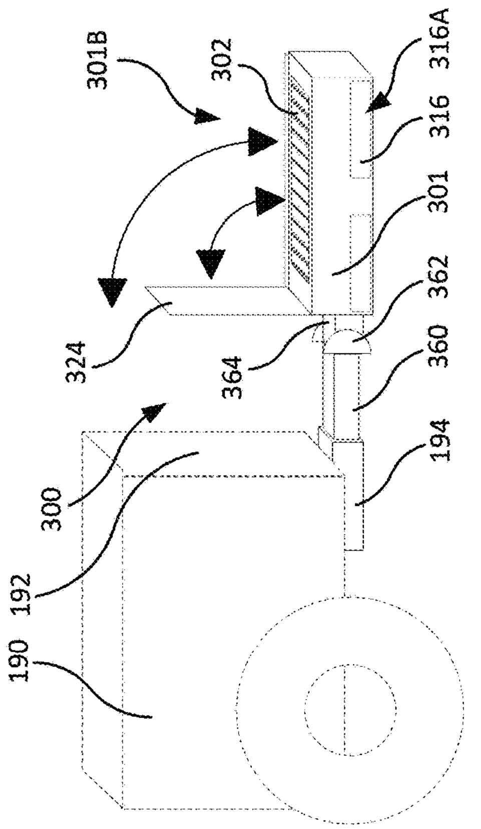
FIG. 3B is a perspective view of an example embodiment of a portable grill and fire pit assembly in a first partially-deployed position.
Figure 3C:
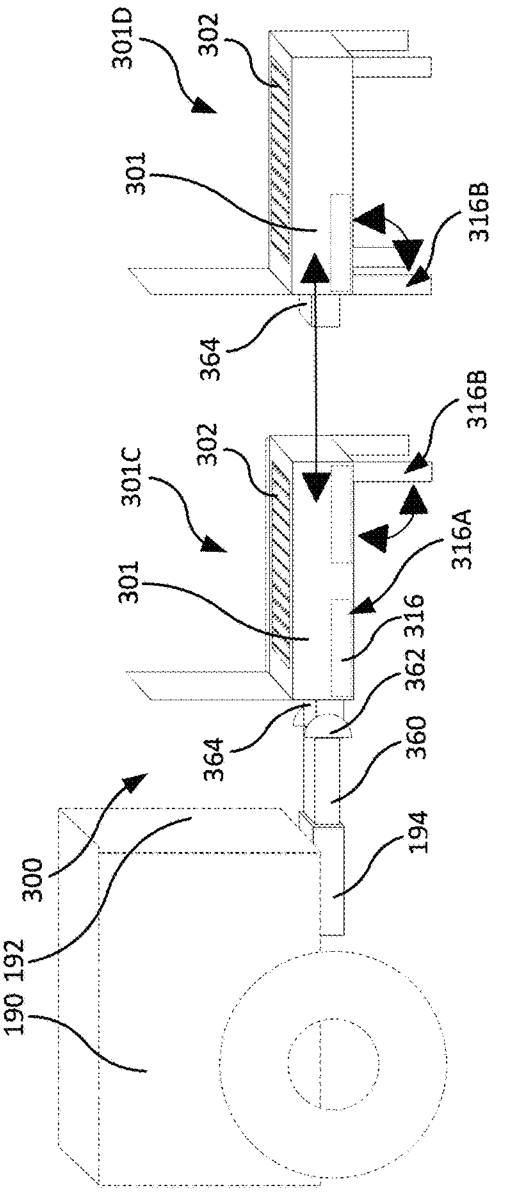
FIG. 3C is a perspective view of an example embodiment of a portable grill and fire pit assembly in a second partially-deployed position and a fully-deployed position.

FIGS. 3A-3C illustrate an example embodiment of a grill assembly 300. The grill assembly 300 comprises grill 301 and hitch 360 configured to couple grill 301 to the hitch receiver 194 of a vehicle 190. A first end of hitch 360 is sized and shaped to be received in the hitch receiver 194 of a vehicle as shown in FIGS. 3A-3C. The second end of hitch 360 comprises hitch knuckle 362. Grill 301 comprises attachment point 364 configured to couple grill 301 to hitch knuckle 362 and allow grill 301 to articulate between a stowed position 301A and a first partially-deployed position 301B and/or a second partially-deployed position 301C. Finally, grill 301 can be fully removed from vehicle 190 and placed in a fully-deployed position 301D.

Referring now to FIG. 3A, grill assembly 300 can secure a grill 301 to a vehicle exterior 192 of vehicle 190 having hitch receiver 194 such that grill 301 can be transported by vehicle. A first end of hitch 360 is received into hitch receiver 194 on vehicle exterior 192 and secured therein. The second end of hitch 360 comprises hitch knuckle 362. Attachment point 364 of grill 301 is secured to hitch knuckle 362. Grill 301 is pivoted about hitch knuckle 362 such that grill 301 is folded up adjacent to vehicle exterior 192. With grill 301 thus folded adjacent to vehicle exterior 192 and secured to hitch receiver 194, grill 301 occupies stowed position 301A and is ready for transport.

From stowed position 301A, grill 301 can be folded down, pivoting about hitch knuckle 362 to occupy a first partially-deployed position 301B. Referring now to FIG. 3B, grill 301 in first partially-deployed position 301B is secured to vehicle 190 via hitch 360 and extends away from vehicle exterior 192 such that a cooking surface 302 of grill 301 is largely parallel to a ground surface. A plurality of collapsible legs 316 disposed on grill 301 are in retracted position 316A, disposed adjacent to grill 301. Lid 324 can be opened to expose cooking surface 302. In the first partially-deployed position 301B, grill 301 is ready for use as a grill.

From stowed position 301A or first partially-deployed position 301B, grill 301 can be placed in second partially-deployed position 301C. Referring now to FIG. 3C, grill 301 in second partially-deployed position 301C is secured to vehicle 190 via hitch 360 and extends away from vehicle exterior 192 such that cooking surface 302 is largely parallel to a ground surface. At least some of the plurality of collapsible legs 316 are in extended position 316B such that the collapsible legs support grill 301 above the ground surface. In the second partially-deployed position 301C, grill 301 is ready for use as a grill.

From either stowed position 301A or partially-deployed positions 301B or 301C, grill 301 can be fully removed from vehicle 190 by extending plurality of collapsible legs 316 to extended position 316B, uncoupling attachment point 364 from hitch knuckle 362, and placing grill 301 on a ground surface. Grill 301 now occupies fully-deployed position 301D and is ready for use at any distance from vehicle 190.

When in stowed position 301A (as shown in FIG. 3A), grill 301 is stowed adjacent to vehicle exterior 192, supported by hitch receiver 194 and ready for transport. Because grill 301 can occupy stowed position 301A, grill 301 can be nicely transported by vehicle 190 between locations, such as user's home and an outdoor recreation site. Stowed position 301A shortens the exterior dimensions of combined vehicle 190 and grill assembly 300 relative to first partially-deployed position 301B for safer driving and parking. Because grill 301 can occupy partially-deployed positions 301B and 301C and/or fully-deployed position 301D, grill 301 can position a cooking surface 302 out from vehicle exterior 192 and elevate that cooking surface 102 off the ground so to warm and cook meals at outdoor recreation sites. When the meal is finished and grill 301 no longer needed, grill assembly 300 allows grill 301 to transition to stowed position 301A by means of retracting the plurality of collapsible legs 316 to retracted position 316A, and pivoting grill 301 about hitch knuckle 362. This folds the grill 301 up into stowed position 301A adjacent to vehicle 190 for storage or transport to a different location.

In some embodiments, grill 301 does not comprise plurality of collapsible legs 316 and can occupy stowed position 301A and first partially-deployed position 301B.

Figure 4:
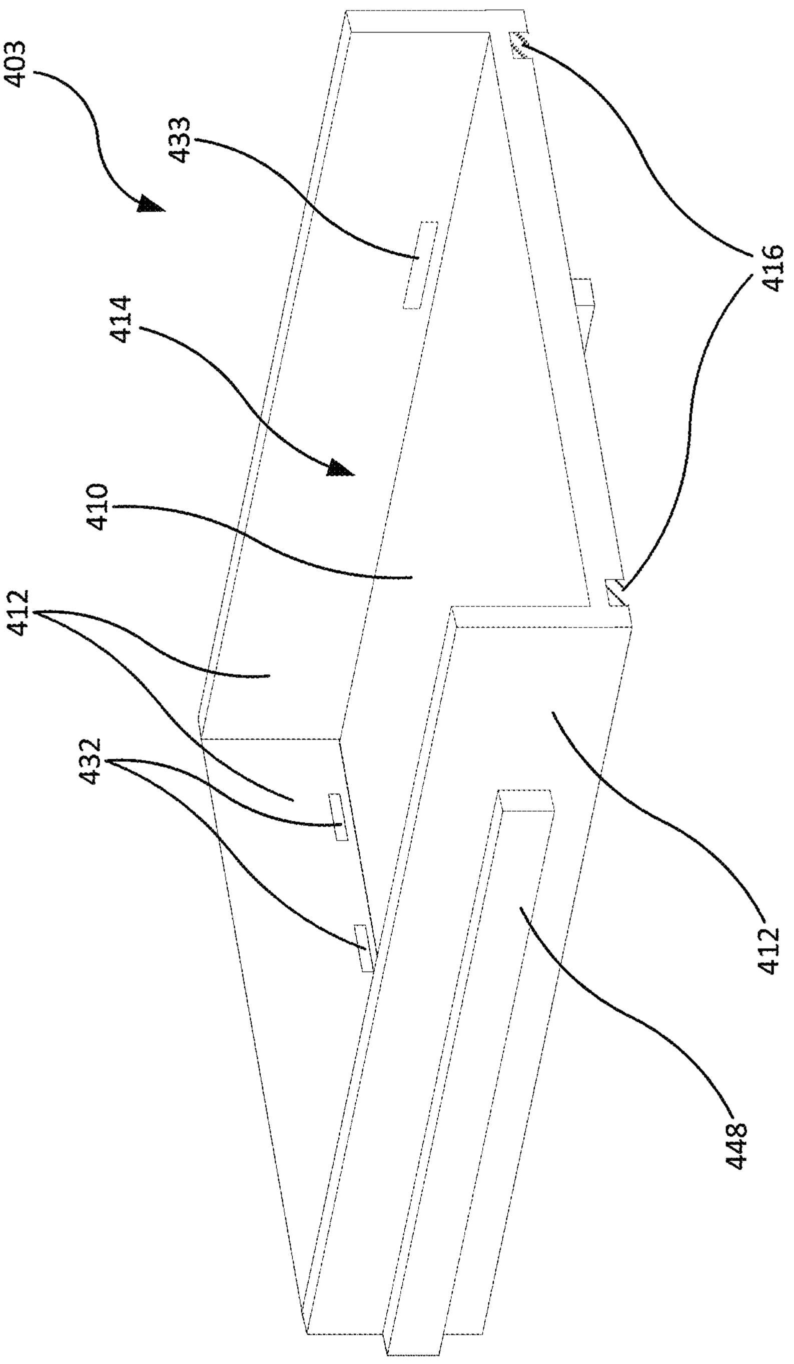
FIG. 4 is a perspective view of an example embodiment of a grill body of a portable grill and fire pit assembly.

FIG. 4 illustrates an example embodiment of grill body 403 of a grill of a grill assembly, with the cooking surface removed and plurality of collapsible legs 416 in a retracted position. Grill body 403 comprises a base surface 410 and a plurality of sidewalls 412 surrounding base surface 410. The plurality of sidewalls 412 and base surface 410 form a space 414 within grill body 403. Space 414 can contain the heat source for the grill, such as burning charcoal or a propane burner. When a cooking surface is in place above space 114, the space 114 can be bounded at least by the cooking surface, the base surface 410, and the plurality of sidewalls 412.

Figure 9D:
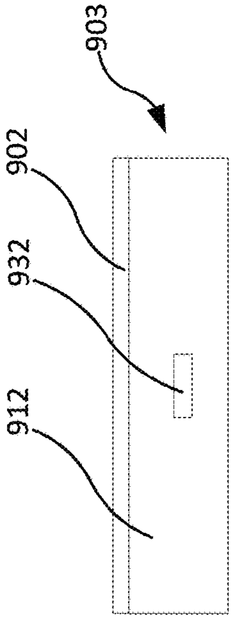
FIG. 9D is a rear view of an example embodiment of a grill body for a portable stove and fire pit assembly configured for a single burner.
Figure 9E:
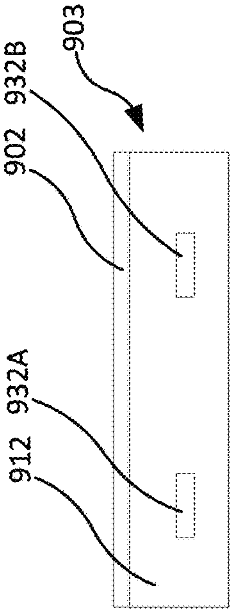
FIG. 9E is a rear view of an example embodiment of a grill body for a portable stove and fire pit assembly configured for two burners.
Figure 9F:
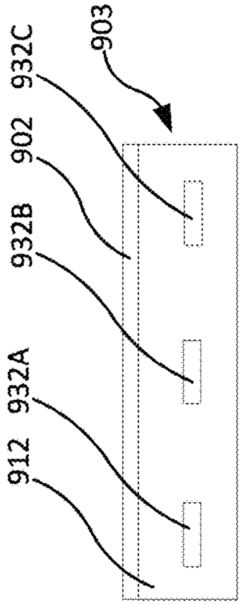
FIG. 9F is a rear view of an example embodiment of a grill body for a portable stove and fire pit assembly configured for three burners.

The plurality of sidewalls 412 can be four sidewalls. One or more of the plurality of sidewalls 412 can be physically connected to a cooking surface when a cooking surface is in place. One or more of the plurality of sidewalls 412 can be physically connected to the base surface 410. The plurality of sidewalls 412 can be monolithically formed with the base surface 410 such that the base surface 410 and the plurality of sidewalls 412 are one piece. In some embodiments, the plurality of sidewalls 412 is separate from the base surface 410. In some embodiments, the base surface 410 and the plurality of sidewalls 412 are connected with engagement features which can hold the base surface 410 to the plurality of sidewalls 412. In some embodiments, these engagement features are clips. In some embodiments, the plurality of sidewalls 412 have engagement features that connect the plurality of sidewalls 412 to the cooking surface 402. These engagements features can be clips, hinges, screws, bolts, etc. In some embodiments, the plurality of sidewalls 412 and the cooking surface 402 can be monolithically formed. In some embodiments, at least one of the plurality of sidewalls 412 comprises a hole 433 that is configured for a fuel line (e.g., fuel line 934 as shown in FIG. 9C). The propane line can be used to produce heat for grilling via burners, such as propane burners. In some embodiments, at least one of the plurality of sidewalls 412 comprises one or more slots 432 configured to couple to one or more propane burners. According to some embodiments, one or more slots 432 hold one or more propane burners in place within space 414.

In some embodiments, the plurality of sidewalls 412 can have a thin profile. In some embodiments, the plurality of sidewalls 412 can have a low depth, such that the grill can fit underneath a vehicle. In some embodiments, plurality of sidewalls 412 can fold down or be detached, forming a thinner grill body 403 profile for storage and transport. In some embodiments, grill body 403 has a set of rails 448 attached which can be coupled to corresponding set of rails in a chamber of a casing (such as rails 249 of FIG. 2) which allows the grill to slide in and out of the casing.

With cooking surface removed and plurality of collapsible legs 416 retracted as shown in FIG. 2, grill body 403 rests on the ground surface and can be used as a fire pit to contain a fire, such as for camping.

Figure 5:
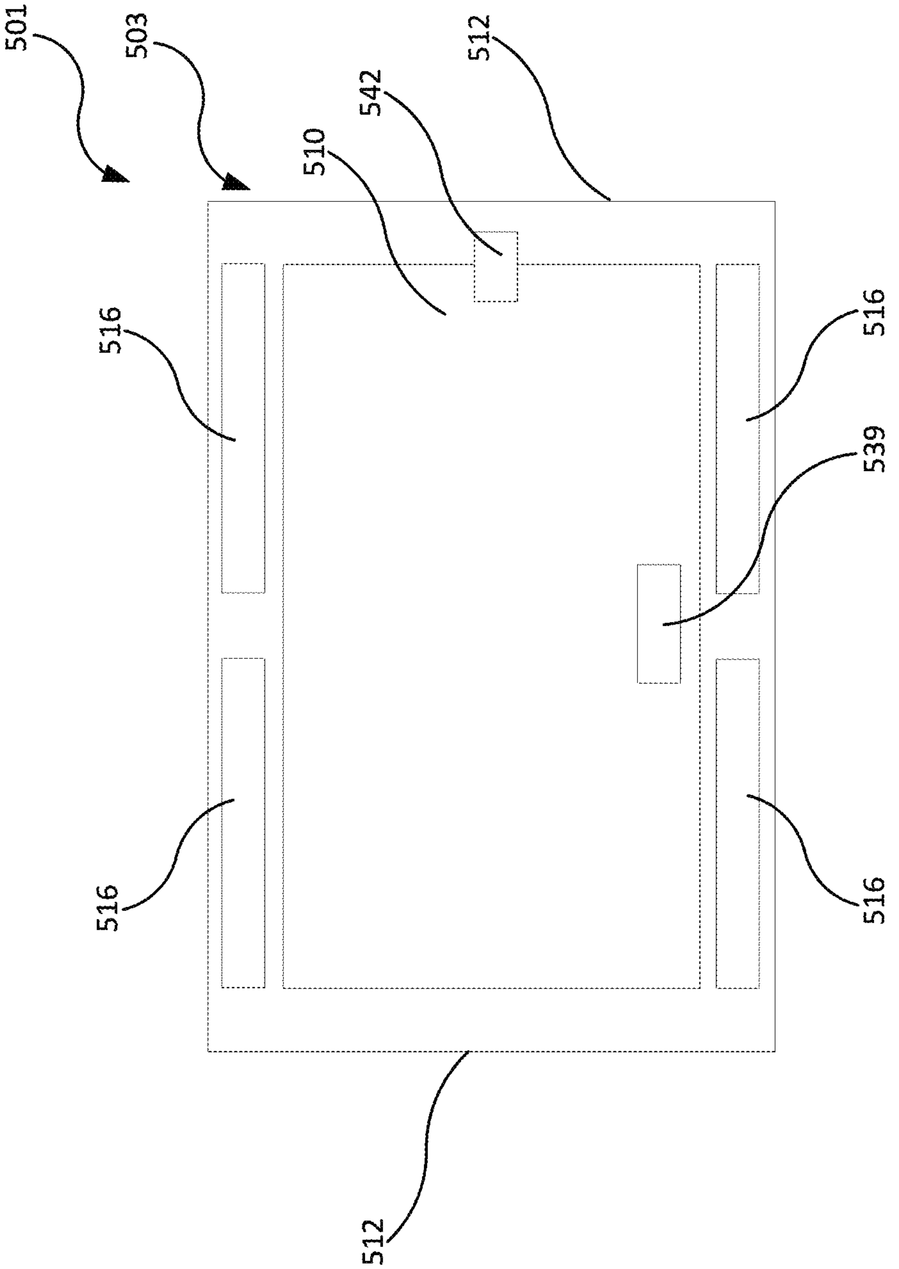
FIG. 5 is a bottom view of an example embodiment of a grill of a portable grill and fire pit assembly in a collapsed position.

FIG. 5 illustrates a bottom view of an example embodiment of grill 501 with the plurality of collapsible legs 116 in retracted position adjacent to the grill 501. As shown in this figure, grill body 503 of grill 501 comprises base surface 510. Base surface 510 is disposed below a cooking surface and below and between a plurality of sidewalls 512. Base surface 510 can be used to contain the heat source for the grill 501, and contain heat and ash that result from grilling. For example, base surface 510 can be used to hold charcoal within grill body 503. In some embodiments, the base surface 510 can be designed such that it has a thin, low profile such so that a vehicle casing sized to receive grill 101 can be short in profile.

In some embodiments, the base surface 510 is removable from the grill. Advantageously, this allows the ash accumulated on base surface 510 to be cleared out. In some embodiments, the base surface 510 is removable from grill 501 by sliding out from underneath grill body 503. In some embodiments, the base surface 510 can have a set of rails which allow the base surface 510 to slide from a position located underneath the cooking surface to a position where the ash can be cleared out. In some embodiments, the base surface 510 can be hinged, such that the base surface 510 can drop from a position beneath the cooking surface to a position in which the base surface 510 has rotated sufficiently to clear away the ash from underneath the cooking surface and within the base surface 510. In some embodiments, the base surface 510 can be clipped to one side of plurality of sidewalls 512 and then when the base surface 510 in unclipped, the base surface 510 drops and the ash falls and hits a lower surface (e.g., ground surface or container).

In some embodiments, base surface 510 is secured to grill 501 at least in part by latch 542. Latch 542 is disposed on grill body 503, and selectively couples base surface 510 to grill 501. When latch 542 is released, the base surface 510 can be displaced and/or removed, and accumulated ash or debris can removed, allowing the user to clean base surface 510.

In some embodiments, the base surface 510 can be connected to the grill 501 by a plurality of engagement features. The plurality of engagement features can be clips, such that the base surface 510 is clipped to the cooking surface 502. In some embodiments, the base surface 510 can be clipped to the plurality of sidewalls 512. When the base surface 510 is unclipped, the base surface 510 can be cleared of ash or debris or cleaned.

In some embodiments, base surface 510 comprises one or more attachment points 539 on its interior surface designed to receive and couple with one or more burners within grill body 503.

In some embodiments, grill 501 comprises a plurality of collapsible legs 516. The plurality of collapsible legs 516 can include four legs. The plurality of collapsible legs 516 are physically connected to grill 501. In some embodiments, the plurality of collapsible legs 516 has springs which, when compressed, allows the legs to collapse into a retracted position beneath grill body 503. In some embodiments, the plurality of collapsible legs 516 has telescopic sections which, when retracted, can allow the legs to collapse into a closed position beneath the grill 501. In some embodiments, the plurality of collapsible legs 516 can be foldable which, when folded, can allow the legs to collapse into a closed position beneath grill body 503. The collapsing mechanism of plurality of collapsible legs 516 allows grill 501 to both be elevated off the ground in use, and be transported on the exterior of a vehicle, such as in a casing or attached to a hitch receiver. In some embodiments, the plurality of collapsible legs 516 can start in a collapsed position, such that the plurality of collapsible legs 516 can be folded to ensure the grill 501 can fit underneath the vehicle. The plurality of collapsible legs 516 can also be extended, such that the plurality of collapsible legs 516 can support grill 501 off the ground surface. In some embodiments, the plurality of collapsible legs can partially support grill 501 off the ground, with the remainder of the support from a connection between grill 501 and the vehicle.

In some embodiments, the plurality of collapsible legs 516 comprise high strength springs, such that the grill 501 can support various weight loads without collapsing when the plurality of collapsible legs 516 are fully extended. In some embodiments, the plurality of collapsible legs 516 are hinged to allow the legs to fold into a collapsed position so that the grill assembly can fit underneath a vehicle or folded up adjacent to a vehicle. In some embodiments, the hinge is spring loaded.

In some embodiments, the plurality of collapsible legs 516 are attached to the plurality of sidewalls 512 and are disposed on the sides of grill body 503 when in a retracted position. In some embodiments, the plurality of collapsible legs can detach entirely from grill body 503. In some embodiments, grill 501 comprises a single collapsible leg.

Figure 6:
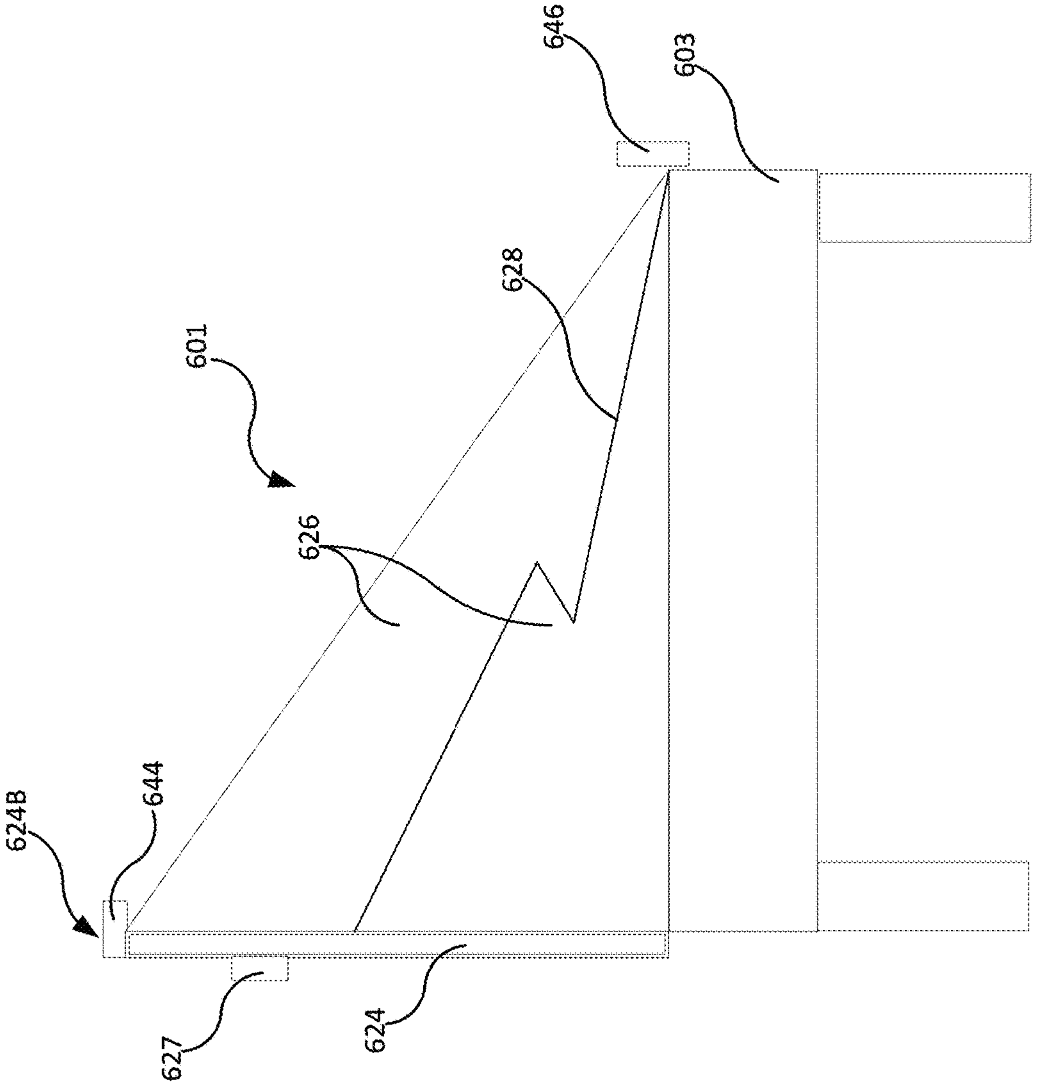
FIG. 6 is a side view of an example embodiment of a grill of a portable grill and fire pit assembly in a deployed position.

FIG. 6 illustrates an example embodiment of grill 601 comprising grill body 603, lid 624, and lid sidewalls 626 with the lid in open position 624B. The lid 624 is designed to be located or positioned above the cooking surface of grill 601 when closed to a cover position. In some embodiments, the lid 624 can be designed to hinge from a closed position above the cooking surface to an open position 624B. In some embodiments, the lid 624 in open position 624B is adjacent to the side of a vehicle. In some embodiments, the lid 624 can be designed to rotate from a cover position to an open position 624B. In some embodiments, the lid 624 can be lifted off the cooking surface and is removable from the grill 601. In the embodiments where the lid 624 can be rotated open, the lid 624 can be rotated from a closed position (0 degrees) to an open position (e.g., 90 degrees).

In some embodiments, the lid 624 can be used as a firewall or to put out a fire. Advantageously, if a fire breaks out in the grill 601 the lid 624 can be used to prevent the fire within the grill 601 from spreading outside of the grill 601 and harming the vehicle, another surface, object, environment, or person. In other embodiments the lid 624 can be used to make the grill a smoker. When the lid 624 is placed on the fire, the lid 624 will cut out the oxygen to the fire and extinguish the flame. Advantageously, the lid 624 can be placed on top of the cooking surface to smoke the food that is within the grill. Lid 624 may comprise a front lock 644 which can couple the lid 624 to the grill body 603 for securing lid 624 in cover position. The lid 624 may comprise latch 627 which can couple the lid 624 to the vehicle for securing lid 624 in open position 624B when grill 601 is in partially-deployed position 601B, adjacent to the vehicle. In some embodiments, latch 627 on the lid 624 is coupled to a chain which can be secured to the vehicle. The chain holds the lid 624 in a vertical (e.g., 90 degrees) position (open position 624B), positioning lid 624 to act as a firewall between the cooking surface and the vehicle.

In some embodiments, lid 624 comprises lid sidewalls 626. Lid sidewalls 626 protect the cooking surface of grill 601 from wind and airborne particles and can focus heat on the cooking surface. In some embodiments, lid sidewalls 626 each have two folding sections which can collapse together at an edge 628 when the user places lid 624 in cover position. In some embodiments, the lid sidewalls 626 are coupled to the plurality of sidewalls 612, where the lid sidewalls can rotate open from a closed position inside grill body 603 to an open position outside of grill body 603. The range of rotation of the foldable sides can be approximately 270 degrees.

In some embodiments, at least one grill lock 646 is disposed on the exterior of grill body 603. The at least one grill lock 646 is configured to couple grill 601 with at least one corresponding attachment point, such as on a casing configured to receive grill 601.

Figure 7:
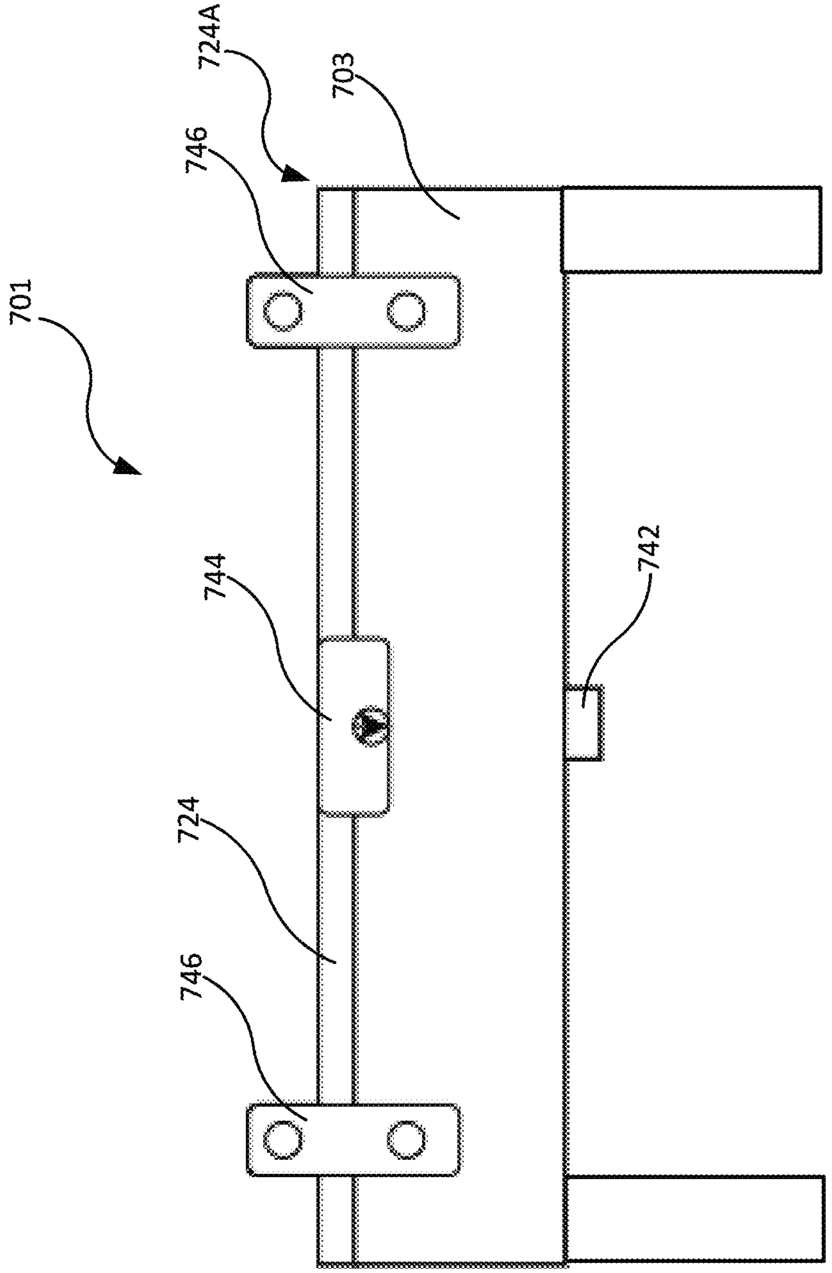
FIG. 7 is a front view of an example embodiment of a grill of a portable grill and fire pit assembly.

FIG. 7 illustrates an example embodiment of grill 701 comprising grill body 703 and lid 724 with lid in cover position 724A. Front lock 744 is disposed on lid 724 and couples lid 724 to grill body 703, securing lid 724 in cover position 724A. In some embodiments, at least one grill lock 746 is disposed on the exterior of grill body 703. In some embodiments, grill lock 746 is configured to couple grill 701 with at least one corresponding attachment point on a vehicle or casing attached thereto. In some embodiments, grill lock 746 secures grill 701 to a vehicle in a stowed position for transport. In some embodiments, grill lock 746 secures grill 701 to a vehicle for use of grill 701. In some embodiments, latch 742 is disposed on the exterior of grill body 703 and allows the user to remove the base surface of grill 701, such as for cleaning.

Figure 8A:
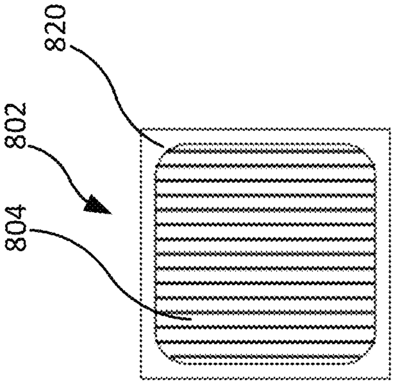
FIG. 8A is a top view of an example embodiment of a cooking surface of a portable grill and fire pit assembly comprising a cooking grate.

FIGS. 8A-8H illustrate example embodiments of cooking surface 802 in various advantageous configurations comprising different types of cooking surfaces, such a grill, a griddle, and a wok. FIG. 8A illustrates an example embodiment of cooking surface 802 comprising a first section 820, which comprises a cooking grate 804 for grilling. The cooking grate 804 has openings through cooking surface 802 such that heat can pass through cooking surface 802 and heat or cook the food.

Figure 8B:
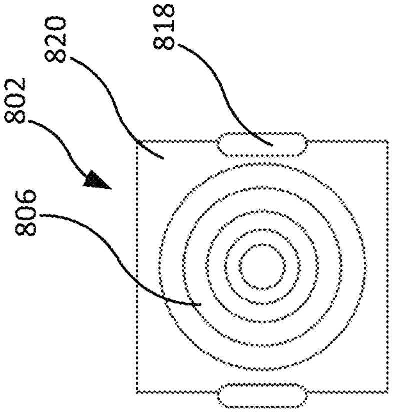
FIG. 8B is a top view of an example embodiment of a cooking surface of a portable grill and fire pit assembly comprising a wok.

FIG. 8B illustrates an example embodiment of cooking surface 802 comprising handles 818 and a first section 820, which comprises a wok 806. The wok 806 can have sloping walls that easily allow one to cook food within the wok 806. Advantageously, the wok 806 can allow certain foods (e.g., soups and stir-frys) to be cooked on grill 801 that might not have traditionally been cooked in a grill. Handles 818 allow the user to lift and maneuver the wok 806 from grill 801 for cooking or serving.

Figure 8C:
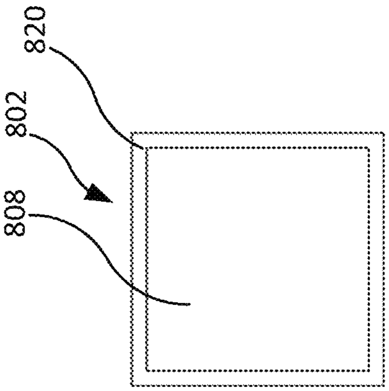
FIG. 8C is a top view of an example embodiment of a cooking surface of a portable grill and fire pit assembly comprising a griddle.

FIG. 8C illustrates an example embodiment of cooking surface 802 comprising a first section 820, which comprises a griddle 808. A griddle is a flat surface that can heat or cook food. Advantageously, the griddle 808 can heat or cook food uniformly. Griddle 808 can keep food from being exposed to anything within the grill. This can allow the grill 801 to cook a variety of foods that would not cook as well on the cooking grate 804, such as scrambled eggs and pancakes.

Figure 8D:
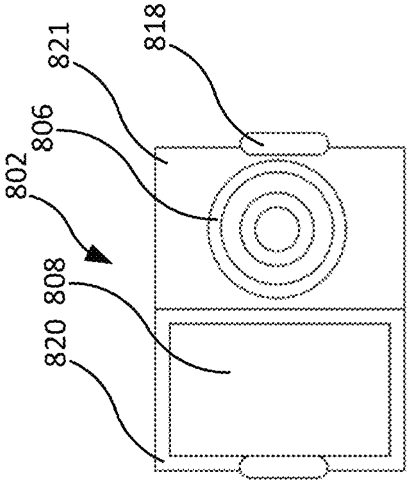
FIG. 8D is a top view of an example embodiment of a cooking surface of a portable grill and fire pit assembly comprising a griddle and a wok.
Figure 8E:
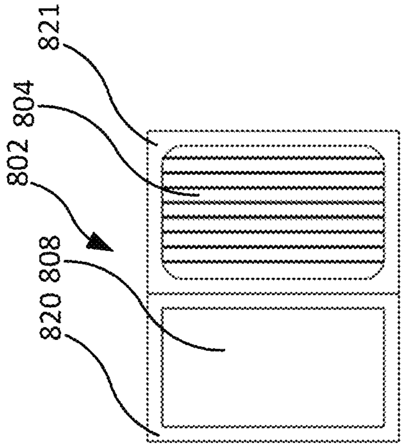
FIG. 8E is a top view of an example embodiment of a cooking surface of a portable grill and fire pit assembly comprising a griddle and a cooking grate.
Figure 8F:
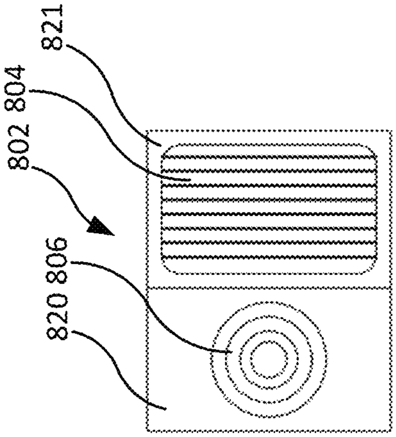
FIG. 8F is a top view of an example embodiment of a cooking surface of a portable grill and fire pit assembly comprising a wok and a cooking grate.

In some example embodiments of cooking surface 802, cooking surface 802 comprises more than one section, such that different dishes can be prepared by multiple cooking methods on the same grill. FIG. 8D illustrates an example embodiment of a cooking surface 802 comprising a first section 820 and a second section 821, dividing the cooking surface 802 into two parts. Here, the first section 820 comprises a griddle 808, and the second section 821 comprises a wok 806. FIG. 8E illustrates an example embodiment of a cooking surface 802 comprising a first section 820 comprising a griddle 808, and a second section 821 comprising a cooking grate 804. FIG. 8F illustrates an example embodiment of a cooking surface 802 comprising a first section 820 comprising a wok 806, and a second section 821 comprising a cooking grate 804.

Figure 8H:
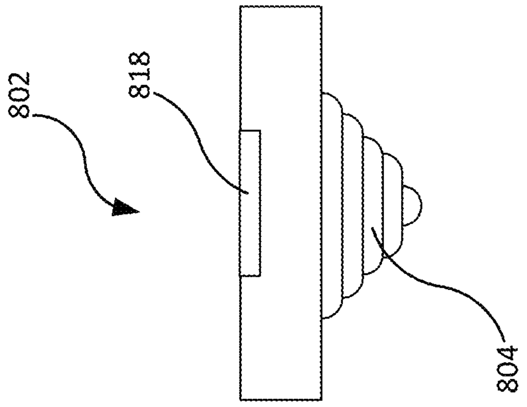
FIG. 8H is a side view of the cooking surface of FIG. 8G.
Figure 8G:
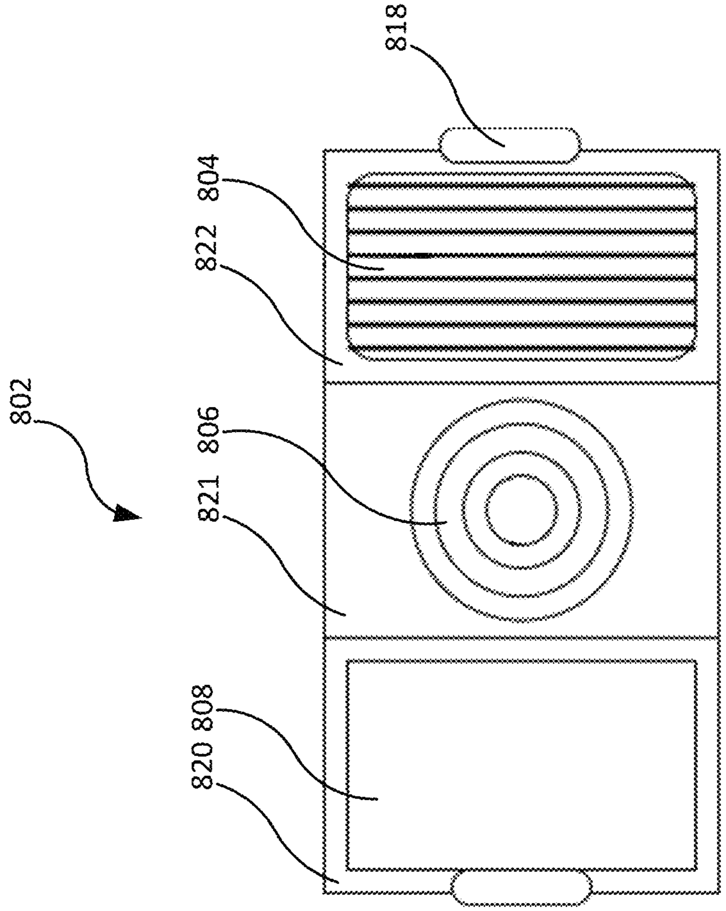
FIG. 8G is a top view of an example embodiment of a cooking surface of a portable grill and fire pit assembly comprising a wok and a cooking grate.

FIG. 8G-8H illustrate an example embodiment of cooking surface 802, wherein cooking surface 802 comprises three sections. The first section 820 comprises a griddle 808. The second section 821 comprises a wok 806. The third section 822 comprises cooking grate 804. By having three sections with different types of cooking surface, the cooking surface 802 can be capable of cooking a variety of different food types in a variety of different methods. For example, a person could cook a standard grill item on the cooking grate 804 (e.g., burger, hot dog, chicken, etc.), a different item on the griddle 808 (e.g., sausage, thinly shredded meat, eggs, pancakes, etc.), and a different item on the wok 806 (e.g., stir fry, soup, etc.) all at the same time.

In some embodiments, the cooking surface 802 can be modular. Advantageously, the cooking surface 802 can be changed based on the needs of the user. Therefore, a user could have multiple griddles, or multiple cooking grates, or multiple woks on the cooking surface 802 at one time.

In some embodiments, the wok 806 can be collapsible. Advantageously, this allows for the wok 806 to collapse into a flat or thin profile. In some embodiments, handles 818 can be collapsible. Because grill 801 may be transported adjacent to a vehicle, a collapsible wok 806 is advantageous in allowing the grill 801 to require less space overall.

Figure 9A:
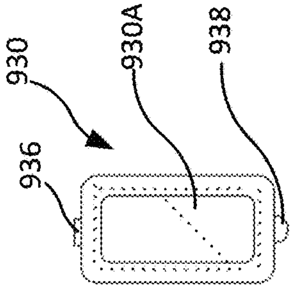
FIG. 9A is a top view of an example embodiment of a one-burner configuration for a portable stove and fire pit assembly.
Figure 9B:
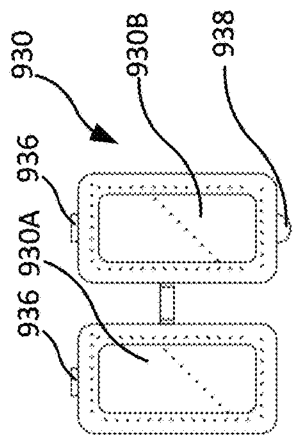
FIG. 9B is a top view of an example embodiment of a two-burner configuration for a portable stove and fire pit assembly.
Figure 9C:
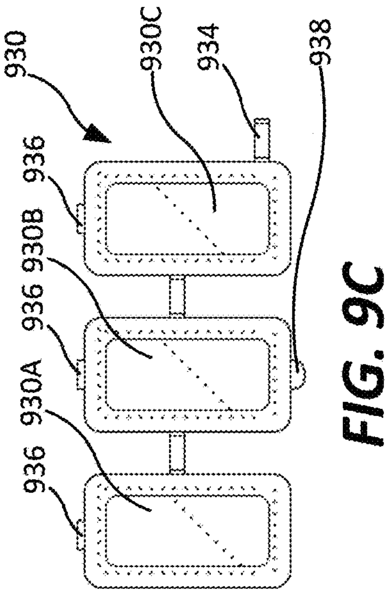
FIG. 9C is a top view of an example embodiment of a three-burner configuration for a portable stove and fire pit assembly.

FIGS. 9A-9C illustrate example embodiments of burner 930 configurations that can be used to heat a grill of a portable grill assembly. FIG. 9A illustrates an example embodiment with a single burner, burner 930A. FIG. 9B illustrates an example embodiment with two burners, burner 930A and burner 930B. FIG. 9C illustrates an example embodiment with three burners, burner 930A, burner 930B, and burner 930C. In some embodiments, the burner 930 comprises a fuel line 934, as shown in FIG. 9C.

The grill body of a grill comprises a space (e.g. space 414 of FIG. 4) bounded by the cooking surface, the base surface, and the plurality of sidewalls. In some embodiments, burners 930 are disposed within the space to heat the cooking surface of the grill. These burners 930 may be propane burners which can be coupled to a propane tank.

Burners 930 can be three burners (e.g., 930A, 930B, 930C), as illustrated in FIG. 9C. In some embodiments, the number of burners 930 matches the number of sections of cooking surface. For example, if cooking surface has a first section and a second section, grill body 903 may contain two burners, burner 930A and burner 930B as illustrated in FIG. 9B. By controlling the fuel input to burner 930A and burner 930B separately, the user can manage the temperature of first section and second section of the cooking surface independently.

In some embodiments, burners 930 comprise coupling mechanisms for securing burners 930 in place within grill body 903. In some embodiments, the coupling mechanisms comprise one or more rear tongues 936 on burners 930 sized and shaped to be received by one or more slots 932A-C disposed on the plurality of sidewalls 912 as illustrated in FIGS. 9D-F. In some embodiments, the coupling mechanisms comprise one or more front tongues 938 on burners 930 sized and shaped to be received by one or more attachment points disposed on base surface of the grill body (e.g., one or more attachment points 539 of FIG. 5).

In some embodiments, the one or more burners 930 can be fixed to the base surface of a grill, such that the burners can heat the space within the grill body and the cooking surface. In some embodiments, the one or more burners 930 can be removed and grill heated with charcoal burning in space. The space within the grill body 903 can be heated in a variety of ways, such that the cooking surface can be heated to cook the food items to their desired temperature.

FIGS. 9D-F illustrate example embodiments of grill body 903 when viewed from the rear. As shown in these figures, one or more of the plurality of sidewalls 912 of grill body 903 may comprise one or more slots 932, where the one or more slots 932 can be used to stabilize one or more burners 930 within the grill body 903 below the cooking surface 902. In some embodiments, the base surface 910 can have one or more attachment points (e.g. attachment points 539 of FIG. 5), where the one or more attachment points are configured to receive one or more front tongues 938 of the burners 930. The one or more attachment points 939 can be welded or molded into the grill body 103 so that the one or more burners 930 resist accidental displacement. In some embodiments, one or more slots 932 and one or more attachment points secure burners 930 in position underneath the one or more sections of cooking surface 902 so that food is cooked evenly and that the one or more burners 930 do not fall out of position and become damaged.

Implementation Details

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Headings are included herein for reference and to aid in locating various sections. These headings are not intended to limit the scope of the concepts described with respect thereto. Such concepts may have applicability throughout the entire specification.

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

It will also be understood that, when a feature or element (for example, a structural feature or element) is referred to as being "connected", "attached" or "coupled" to another feature or element, it may be directly connected, attached, or coupled to the other feature or element or intervening features or elements may be present. In contrast, when a feature or element is referred to as being "directly connected," "directly attached" or "directly coupled" to another feature or element, there may be no intervening features or elements present. Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a," "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/."

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly," "downwardly," "vertical," "horizontal" and the like may be used herein for the purpose of explanation only unless specifically indicated otherwise.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing numeric values of magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

What is claimed is:

1. A vehicle grill assembly, comprising:

a grill, the grill comprising:

a grill body;

a cooking surface disposed on the grill body; and at least one collapsible leg disposed on the grill body, wherein the at least one collapsible leg transitions between a retracted position adjacent to the grill body and an extended position; and a casing for securing the grill to an undercarriage of a vehicle, the casing comprising:

a plurality of casing walls forming a chamber sized and shaped to receive the grill with the at least one collapsible leg in a stowed position; and at least one vehicle mount disposed on the plurality of casing walls configured to couple the casing to the undercarriage of a vehicle.

2. The vehicle grill assembly of claim 1, wherein the grill is configured to receive one or more sections of two or more removable cooking surfaces.

3. The vehicle grill assembly of claim 2, wherein the two or more removable cooking surfaces comprise two or more types of cooking surfaces.

4. The vehicle grill assembly of claim 3, wherein the two or more removable cooking surfaces comprise at least one of a group of types of cooking surfaces comprising: a grill, a griddle, and a wok.

5. The vehicle grill assembly of claim 4, wherein the two or more removable cooking surfaces comprise at least one wok type of cooking surface, and the wok is collapsible.

6. The vehicle grill assembly of claim 2, wherein the grill is configured to receive at least two sections of two or more removable cooking surfaces, and wherein the grill comprises a number of burners within the grill body that is equal to the number of sections of removable cooking surfaces the grill is configured to receive.

7. The vehicle grill assembly of claim 6, wherein the burners are removable from the grill body such that the grill can be used as a fire pit.

8. The vehicle grill assembly of claim 1, wherein the casing further comprises rails disposed within the chamber formed by the plurality of casing walls, configured to slide the grill into and out of the casing.

9. The vehicle grill assembly of claim 8, wherein the rails at least partially support the grill in a partially-deployed position outside the casing.

10. The vehicle grill assembly of claim 1, wherein the grill comprises a lid that articulates between a cover position covering the cooking surface and an open position, wherein the lid comprises lid sidewalls and a latch to couple the lid to a vehicle exterior for securing the lid in the open position.

11. The vehicle grill assembly of claim 1, wherein the grill body comprises a plurality of sidewalls, wherein the plurality of sidewalls are collapsible.

12. The vehicle grill assembly of claim 1, wherein the at least one collapsible leg is a plurality of collapsible legs, and the plurality of collapsible legs is configured to support the grill above a ground surface in a fully-deployed position when the grill is fully removed from the casing.

13. A method of collapsing and storing a grill beneath a vehicle, the method comprising:

collapsing a plurality of collapsible legs of the grill; and sliding the grill into a casing sized and shaped to receive the grill, wherein the casing is secured to an undercarriage of the vehicle.

* * * * *